(12) United States Patent
Ren et al.

(10) Patent No.: US 11,654,557 B2
(45) Date of Patent: May 23, 2023

(54) DIRECT FORCE FEEDBACK CONTROL METHOD, AND CONTROLLER AND ROBOT USING THE SAME

(71) Applicant: UBTECH ROBOTICS CORP LTD, Shenzhen (CN)

(72) Inventors: Xiaoyu Ren, Shenzhen (CN); Liqun Huang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 231 days.

(21) Appl. No.: 17/198,167

(22) Filed: Mar. 10, 2021

(65) Prior Publication Data

US 2021/0387334 A1 Dec. 16, 2021

(30) Foreign Application Priority Data

Jun. 12, 2020 (CN) .......................... 202010538326.5

(51) Int. Cl.
 *B25J 9/16* (2006.01)
 *B25J 13/08* (2006.01)

(52) U.S. Cl.
 CPC .......... *B25J 9/1633* (2013.01); *B25J 9/1607* (2013.01); *B25J 13/085* (2013.01); *B25J 13/089* (2013.01); *G05B 2219/37091* (2013.01); *G05B 2219/50391* (2013.01)

(58) Field of Classification Search
 CPC ...... B25J 9/1633; B25J 9/1607; B25J 13/085; B25J 13/089; B25J 9/1602; B25J 9/1646; G05B 2219/37091; G05B 2219/50391; G05B 2219/39346
 See application file for complete search history.

(56) References Cited

U.S. PATENT DOCUMENTS

| | | | |
|---|---|---|---|
| 2017/0274530 A1 * | 9/2017 | Mottram | B25J 9/1638 |
| 2018/0229366 A1 * | 8/2018 | Abdallah | B25J 9/1633 |
| 2020/0282558 A1 * | 9/2020 | Kim | B25J 9/1607 |
| 2020/0306964 A1 * | 10/2020 | Neville | B25J 9/0096 |

FOREIGN PATENT DOCUMENTS

| | | | | |
|---|---|---|---|---|
| WO | WO-2017186602 A1 * | 11/2017 | | B25J 11/008 |
| WO | WO-2020001742 A1 * | 1/2020 | | |

\* cited by examiner

*Primary Examiner* — Adam R Mott
*Assistant Examiner* — Sagar Kc (57) ABSTRACT

A direct force feedback control method as well as a controller and a robot using the same are provided. The method includes: obtaining an actual position and an actual speed of an end of the robotic arm and an actual external force acting on the end in a Cartesian space; calculating an impedance control component of the end in the Cartesian space based on the obtained actual position, the obtained actual speed, the obtained actual external force, an expected position, an expected speed, and an expected acceleration of the end; calculating a force control component of the end in the Cartesian space based on an expected interaction force acting on the end, the actual external force, and the actual speed; determining whether the actual external force is larger than a preset threshold, and obtaining a total force control quantity of the end of the robotic arm in the Cartesian space.

18 Claims, 6 Drawing Sheets

DIRECT FORCE FEEDBACK CONTROL METHOD, AND CONTROLLER AND ROBOT USING THE SAME

CROSS REFERENCE TO RELATED APPLICATIONS

The present disclosure claims priority to Chinese Patent Application No. 202010538326.5, filed Jun. 12, 2020, which is hereby incorporated by reference herein as if set forth in its entirety.

BACKGROUND

1. Technical Field

The present disclosure relates to robot control technology, and particularly to a direct force feedback control method as well as a controller and a robot using the same.

2. Description of Related Art

There are generally two methods for controlling a robot, namely direct force feedback control and indirect force feedback control. In which, the direct force feedback control refers to take the feedback force or torque as force control instruction for joint control, and the indirect force feedback control generally refers to convert the feedback force or torque into corresponding position instruction for joint control. The direct force feedback control can be in some scenes that require higher precision in force control, for example, parts grinding and scrubbing for industrial applications, massaging for service applications.

However, in the actual application of the traditional direct force feedback controller, during the robot changes from in contact with the environment to not in contact with the environment, or from not in contact with the environment to in contact with the environment, the joint limits of the robot may be quickly exceeded due to the rapid response of the force feedback controller, or damage may be caused to the robot or the environment due to the excessive force appears when it is in contact with the environment.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure.

Generally, the components in the embodiments of the present disclosure that are described and shown in the drawings may be arranged and designed in various different configurations. Therefore, the following detailed descriptions for the embodiments of the present disclosure are not intended to limit the scope of the present disclosure, but merely represents the selected embodiments of the present disclosure. Based on the embodiments of the present disclosure, all other embodiments obtained by those skilled in the art without creative work shall fall within the scope of the present disclosure.

Hereinafter, the terms "including", "having" and their cognates that are used in the embodiments of the present disclosure are only intended to represent specific features, numbers, steps, operations, elements, components, or combinations of the foregoing, and should not be understood as first excluding the possibility to have one or more other features, numbers, steps, operations, elements, components, or combinations of the foregoing or add one or more features, numbers, steps, operations, elements, components, or combinations of the foregoing.

In addition, the terms "first", "second", "third", and the like in the descriptions are only used for distinguishing, and cannot be understood as indicating or implying relative importance.

Unless otherwise defined, all terms (including technical and scientific terms) used herein have the same meanings as commonly understood by those skilled in the art of the embodiments of the present disclosure. The terms (e.g., those defined in commonly used dictionaries) will be interpreted as having the same meaning as the contextual meaning in the related technology and should not be interpreted as having idealized or overly formal meanings, unless clearly defined in the embodiments of the present disclosure.

Embodiment 1

Figure 1:
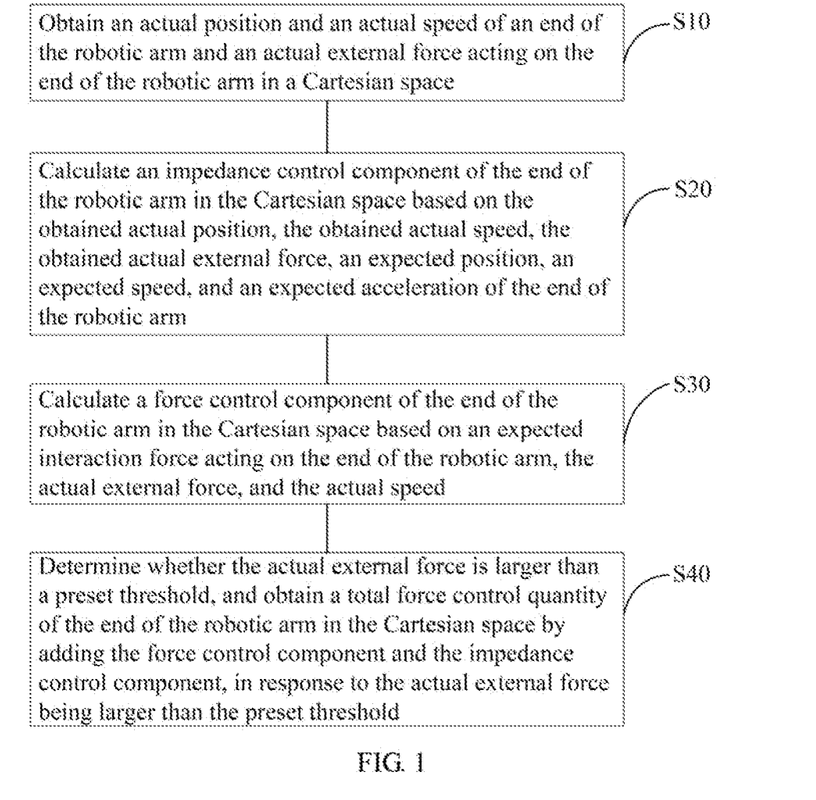
FIG. 1 is a flow chart of an embodiment of a direct force feedback control method according to the present disclosure.

FIG. 1 is a flow chart of an embodiment of a direct force feedback control method according to the present disclosure. In this embodiment, the direct force feedback control method is a computer-implemented method executable for a processor. The method can be used to, for example, control a robotic arm with redundant degrees of freedom (and a robot containing the robotic arm), which can output precise force control to an end (e.g., end effector) of the robotic arm. The method may be implemented through a robotic arm controller shown in FIG. 5 or a direct force feedback control apparatus shown in FIG. 6. As shown in FIG. 1, the method includes the following steps.

S10: obtaining an actual position and an actual speed of an end of the robotic arm and an actual external force acting on the end of the robotic arm in a Cartesian space.

In one embodiment, an angular displacement $q_{act}$ (also referred to as trajectory information) of each joint of the robotic arm can be collected through an angular displacement sensor, a position encoder or the like that is installed at the joint, and then the angular displacement $q_{act}$ can be differentiated to obtain a corresponding angular velocity $\dot{q}_{act}$ of the joint. In other embodiments, an angular velocity or the like of each joint may also be measured directly using an angular velocity sensor.

Since the joint-related data (i.e., angular displacement $q_{act}$ and angular velocity $\dot{q}_{act}$) obtained above is with respect to the joint space of each joint, in order to realize the direct torque or force control of the joint, it needs to calculate the actual position and actual speed of the end of the robotic arm in the Cartesian space using forward kinematics based on the joint-related data in the joint space. In this embodiment, since the end of the robotic arm executes tasks in the Cartesian space, the Cartesian space is also referred to as the task space.

In one embodiment, the end of the robotic arm is provided with a force sensor such as a six-dimensional force sensor, and an interactive force between the end of the robotic arm and the external contact surface, that is, the external force actually acting on the end, can be measured through the force sensor.

In this embodiment, when calculating the force control to be outputted to the robotic arm, two parts of control quantities should be considered, namely the control quantities based on impedance control, and the control quantities obtained by performing direct force feedback closed-loops using the force deviation between the actual external force acting on the end of the robotic arm and an expected interaction force. By introducing force feedback closed-loop and impedance control, the sum of these two kinds of control quantities is used as a total force control to be outputted to the end, which can realize more precise force control for the end and make the movements of the end more smooth.

S20: calculating an impedance control component of the end of the robotic arm in the Cartesian space based on the obtained actual position, the obtained actual speed, the obtained actual external force, an expected position, an expected speed, and an expected acceleration of the end of the robotic arm.

Figure 2:
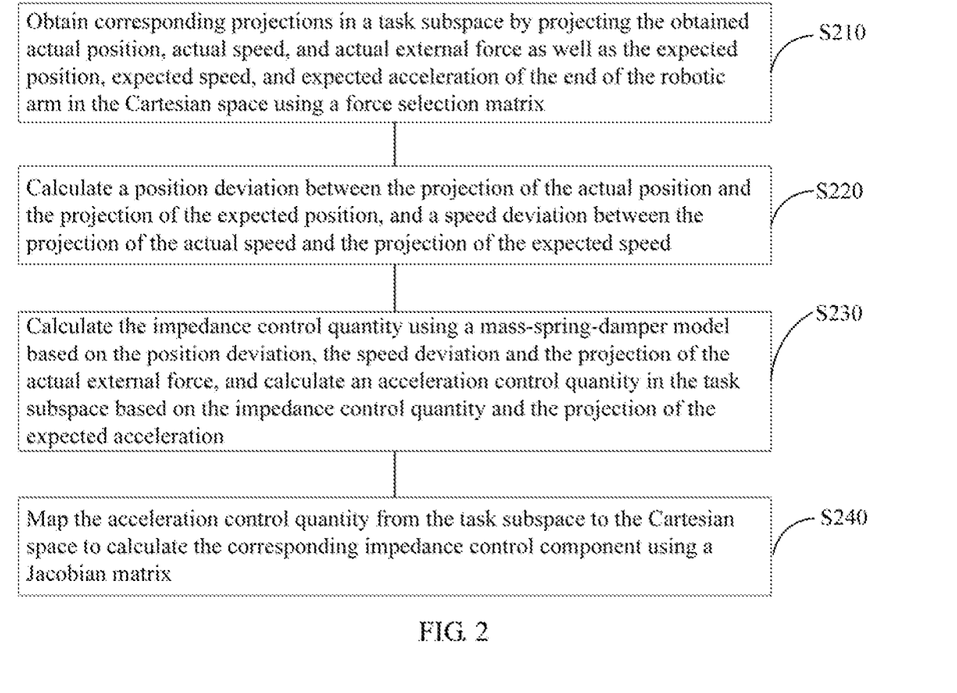
FIG. 2 is a flow chart of step 20 of the direct force feedback control method of FIG. 1.

FIG. 2 is a flow chart of step 20 of the direct force feedback control method of FIG. 1. As shown in FIG. 2, in one embodiment, step S20 of calculating the impedance control component may mainly include the following steps.

S210: obtaining corresponding projections in a task subspace by projecting the obtained actual position, actual speed, and actual external force as well as the expected position, expected speed, and expected acceleration of the end of the robotic arm in the Cartesian space using a force selection matrix.

In this embodiment, the impedance control mainly includes generating a generalized control force in the Cartesian space based on a position deviation, a speed deviation, and an external environmental force to convert into a torque of the joint space so as to control the robotic arm to move. Generally, the selection matrix is mainly used to project the relevant parameters, for example, the above-mentioned kinematic parameters such as position and speed and/or dynamic parameters such as the external environmental force in the Cartesian space to the task subspace in the selected control direction. for example, if a position control direction is selected, the task subspace is a position control subspace, and if a force control direction is selected, the task subspace is a force control subspace. The force selection matrix is a selection matrix corresponding to the force control direction, which can be customized according to actual needs while the column vectors of the force selection matrix should be orthogonal to each other.

In one embodiment, after performing a force control subspace transformation on the above-mentioned actual position, actual speed, and actual external force as well as the expected position, expected speed, and expected acceleration using the predefined force selection matrix, their corresponding projections in the force control subspace will be obtained.

For example, if the force selection matrix is $S_F$, and the obtained actual position of the end of the robotic arm in the Cartesian space is $x_{act}$, then its projection in the current task subspace is $x_{act}^S = S_F^* \cdot x_{act}$ or $x_{act}^S = S_F^T \cdot x_{act}$, where $S_F^*$ and $S_F^T$ are the pseudo inverse and transpose of the force selection matrix, respectively.

Similarly, for other parameters, the projection of the actual velocity $\dot{x}_{act}$ is $\dot{x}_{act}^S$; the projection of the actual external force $F_{ext}$ is $F_{ext}^S$; the projection of the expected position $x_{ref}$ is $x_{ref}^S$; the projection of the expected speed $\dot{x}_{ref}$ is $\dot{x}_{ref}^S$, and the projection of the expected acceleration $\ddot{x}_{ref}$ is $\ddot{x}_{ref}^S$.

S220: calculating a position deviation between the projection of the actual position and the projection of the expected position, and a speed deviation between the projection of the actual speed and the projection of the expected speed.

In one embodiment, the position deviation between the projection $x_{act}^S$ of the actual displacement and the projection $x_{ref}^S$ of the expected displacement, that is, the position deviation in the current task subspace, is $(x_{ref}^S - x_{act}^S)$. Similarly, the velocity deviation in the current task subspace is $(\dot{x}_{ref}^S - \dot{x}_{act}^S)$.

S230: calculating the impedance control quantity using a mass-spring-damper model based on the position deviation, the speed deviation and the projection of the actual external force, and calculating an acceleration control quantity in the task subspace based on the impedance control quantity and the projection of the expected acceleration.

In order to ensure the smooth movement of the robotic arm, the robotic arm may be equivalent to a mass-spring-damper system, and the corresponding impedance control quantity may be calculated based on the mass-spring-damper model. In one embodiment, in the case that the stiffness coefficient corresponding to the impedance control is $K_d$, the quality coefficient is $M_d$, and the damping coefficient is $D_d$, the impedance control quantity will be $K_d(x_{ref}^S - x_{act}^S) + D_d(\dot{x}_{ref}^S - \dot{x}_{act}^S) - F_{ext}^S$.

Then, the impedance control quantity is added with the projection of the expected acceleration to obtain the acceleration control quantity of the current task subspace. In one embodiment, if the projection of the expected acceleration is $\ddot{x}_{ref}^S$, and the projection of the actual external force is $F_{ext}^S$ and the acceleration control quantity $\ddot{x}_{cmd}^S$ in the task subspace meets an equation of:

$$M_d \ddot{x}_{cmd}^S = M_d \ddot{x}_{ref}^S + K_d(x_{ref}^S - x_{act}^S) + D_d(\dot{x}_{ref}^S - \dot{x}_{act}^S) - F_{ext}^S.$$

S240: mapping the acceleration control quantity from the task subspace to the Cartesian space to calculate the corresponding impedance control component using a Jacobian matrix.

After the acceleration control quantity in the current task subspace is calculated, it is mapped to the Cartesian space using the force selection matrix. Then, the joint angular acceleration corresponding to the joint space is calculated using Jacobian matrix based on the acceleration control quantity in the Cartesian space. Finally, the corresponding joint torque impedance control component is calculated.

In one embodiment, if the acceleration control quantity in the task subspace is $\ddot{x}_{cmd}^S$, the acceleration control quantity in the Cartesian space is $\ddot{x}_{cmd}$, and the Jacobian matrix is $J$ and its generalized inverse is $J^{190}$, then the joint angular acceleration $\ddot{q}_{cmd}$ and the joint torque impedance control component $\tau_{CarImp}$, will meet equations of:

$$\ddot{q}_{cmd} = J^{\#} S_F \ddot{x}_{cmd}^S;$$

$$\tau_{CarImp} = B(q) \ddot{q}_{cmd}.$$

S30: calculating a force control component of the end of the robotic arm in the Cartesian space based on an expected interaction force acting on the end of the robotic arm, the actual external force, and the actual speed.

Figure 3:
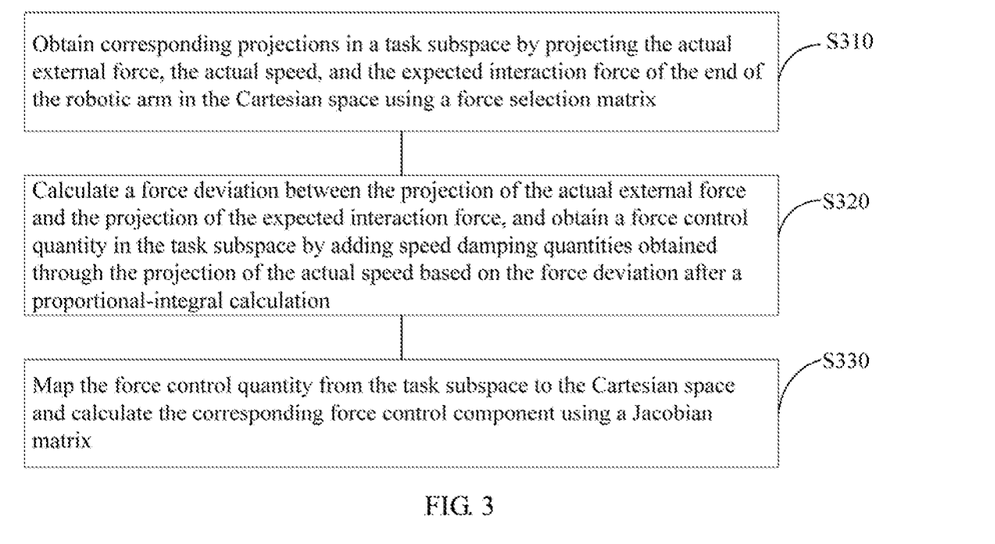
FIG. 3 is a flow chart of step 30 of the direct force feedback control method of FIG. 1.

FIG. 3 is a flow chart of step 30 of the direct force feedback control method of FIG. 1. As shown in FIG. 3, in one embodiment, step S30 of calculating the force control component may mainly include the following steps.

S310: obtaining corresponding projections in a task subspace by projecting the actual external force, the actual speed, and the expected interaction force of the end of the robotic arm in the Cartesian space using a force selection matrix.

For the force control component, the subspace of the selected force control direction is taken as the current task subspace. It can be understood that, the force selection matrix of the force feedback closed-loop control part (see FIG. 5) and the force selection matrix of the impedance control part (see FIG. 5) are the same matrix. In one embodiment, if the force selection matrix is $S_F$, the expected interaction force of the end of the robotic arm in the Cartesian space is $F_{ref}$, and the projection of the expected interaction force can be obtained after subspace transformation is $F_{ref}^S = S_F * F_{ref}$ or $F_{ref}^S = S_F^T F_{ref}$. Similarly, the projection of the actual external force acting on the end of the robotic arm is $F_{ext}^S$, and the projection of the actual speed is $\dot{x}_{act}^S$.

S320: calculating a force deviation between the projection of the actual external force and the projection of the expected interaction force, and obtaining a force control quantity in the task subspace by adding speed damping quantities obtained through the projection of the actual speed based on the force deviation after a proportional-integral calculation.

In this embodiment, the calculated force deviation is used as a part of the force control quantity of the end of the robotic arm after proportional-integral (PI) calculation. In addition, a velocity damping quantity is further added as another part of the force control quantity, and the two parts are added to use as the required force control component. It can be understood that, the force control component for performing force control on the robotic arm is directly calculated by calculating the force deviation between the actual external force in the task subspace and the expected interaction force, which is a direct force feedback control method.

The above-mentioned velocity damping quantity can be calculated through the projection $\dot{x}_{act}^S$ of the actual velocity of the end of the robotic arm in the task subspace and the damping coefficient $D_F$ corresponding the force feedback closed-loop control part through an equation of $-D_F \dot{x}_{act}^S$.

S330: mapping the force control quantity from the task subspace to the Cartesian space and calculating the corresponding force control component using a Jacobian matrix.

After the force control component in the current task subspace is calculated, it is mapped to the Cartesian space using the force selection matrix. Then, the joint control torque corresponding to the joint space, that is, the joint torque impedance control component, is calculated using Jacobian matrix based on the force control component in the Cartesian space.

In one embodiment, if the force control quantity in the task subspace is $F_{cmd}^S$, the force selection matrix is $S_F$, the force control quantity in the Cartesian space is $F_{cmd}$, the Jacobian matrix is $J$ and its transposition is $J^T$, the corresponding joint force control component will meet $\tau_{cmd} = J^T S_F F_{cmd}^S$.

S40: determining whether the actual external force is larger than a preset threshold, and obtaining a total force control quantity of the end of the robotic arm in the Cartesian space by adding the force control component and the impedance control component, in response to the actual external force being larger than the preset threshold.

In this embodiment, two states of having-contacted and out-of-contact between the end and the target environment are distinguished based on the actual external force acting on the end of the robotic arm, so as to achieve more precise end force control. In one embodiment, the actual external force acting on the end in the Cartesian space can be determined by projecting onto the task subspace where the force control direction is located through the force selection matrix. For example, if the projection of the actual external force in the task subspace is larger than a preset threshold, it can be determined that the end of the robotic arm has contacted with the target environment; otherwise, if the projection of the actual external force is less than or equal to the preset threshold, it is determined that the end of the robotic arm has not been in contact or is out of contact.

For example, if the preset threshold is set to 1, it can be determined whether the projection of the actual external force is larger than 1 or not. If it is larger than 1, it is determined that the robotic arm has been in contact with the target environment; if it is smaller than 1, it is determined that the robotic arm has not been in contact or is out of contact. It can be understood that, the preset threshold can be set according to actual needs, and is not limited herein.

If it is determined that the end has contacted, the force control component will be calculated using direct force feedback closed-loop based on the received actual external force, and added with the impedance control component to use as the total force control quantity of the joint. It can be understood that, for the state of having contacted, the end will be subjected to the force of the environment, and the force fed back by the closed-loop is used to directly calculate the corresponding force control quantity, which can track the end force control well so as to continuously adjust the output of the force control of the end.

Figure 4:
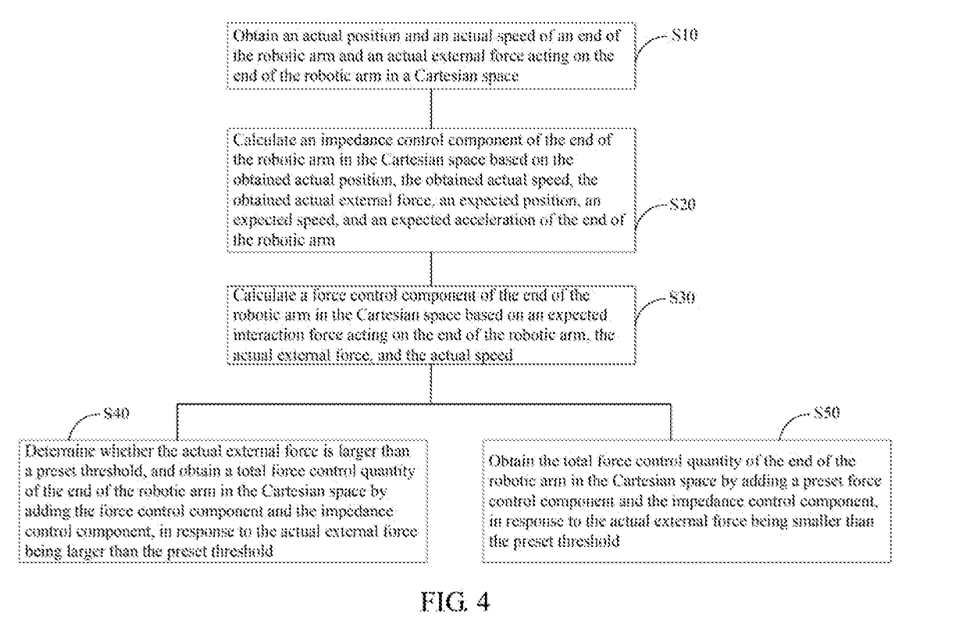
FIG. 4 is a flow chart of another embodiment of a direct force feedback control method according to the present disclosure.

FIG. 4 is a flow chart of another embodiment of a direct force feedback control method according to the present disclosure. As shown in FIG. 4, in some embodiments, as mentioned above, if the end of the robotic arm has not been in contact or is out of contact, the direct force feedback control method may further include the following step.

S50: obtaining the total force control quantity of the end of the robotic arm in the Cartesian space by adding a preset force control component and the impedance control component, in response to the actual external force being smaller than the preset threshold.

In one embodiment, if the actual external force is less than or equal to the above-mentioned preset threshold, the preset force control component can be outputted and added with the impedance control component at this time to use as the total force control quantity of the end of the robotic arm. In some embodiments, the preset force control component may be set to zero.

It can be understood that, in this embodiment, the control quantities for outputting to the end to perform force control are composed of two parts, one is the control quantities controlled by impedance, and the other is mainly the control quantity obtained using force feedback closed-loop based on the measured actual external force acting on the end of the robotic arm.

Figure 5:
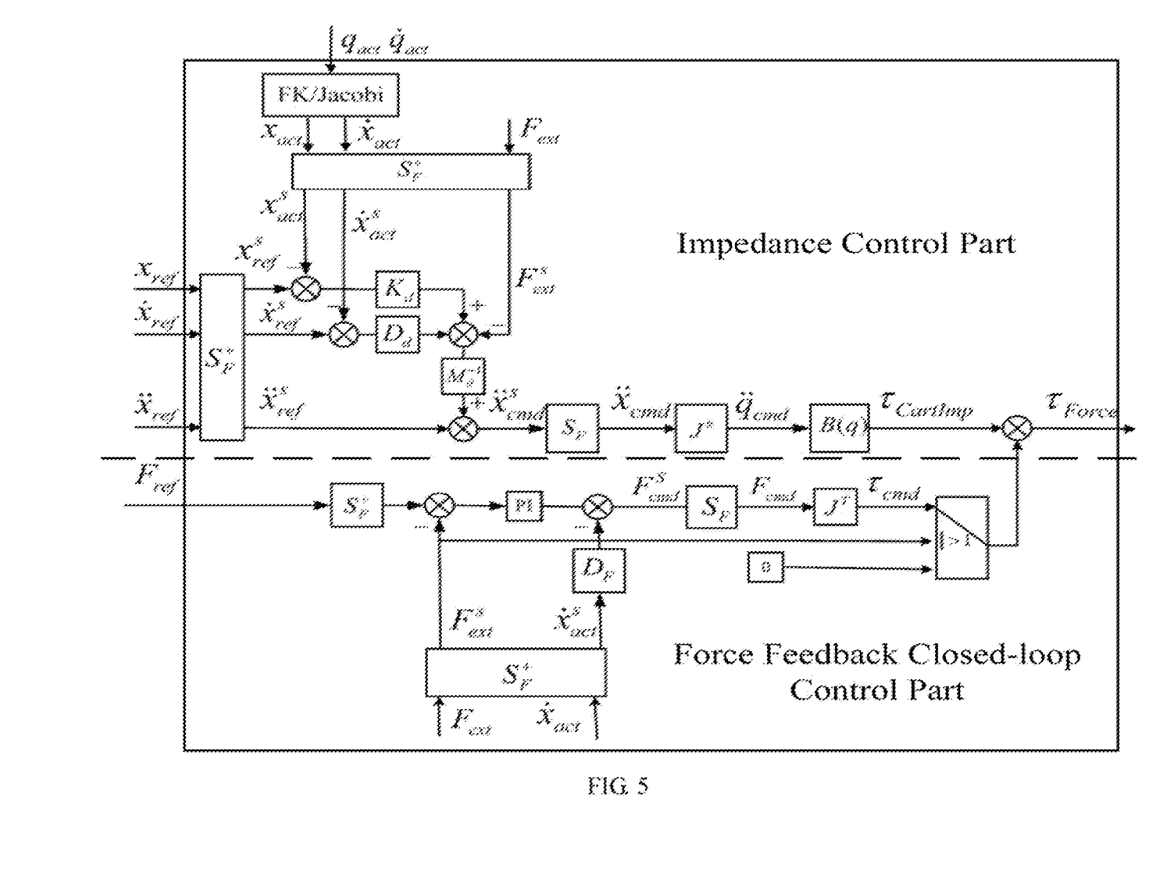
FIG. 5 is a schematic block diagram of a robotic arm controller according to an embodiment of the present disclosure.

FIG. 5 is a schematic block diagram of a robotic arm controller according to an embodiment of the present disclosure. As shown in FIG. 5, a robotic arm controller is provided. The controller mainly includes an impedance control part for outputting the impedance control components $\tau_{Carlmp}$ and a force feedback closed-loop control part for outputting the force control components $\tau_{cmp}$. In which, for the force feedback closed-loop control part, in addition to perform PI calculation on the force deviation between the actual external force and the expected interaction force, a velocity damping quantity is added, and the states of the contact between the end of the robotic arm and the target environment are distinguished to output the corresponding force control. In this way, differentiated controls can be achieved for different contact stages while ensuring safe contact, so as to achieve more precise end force control output.

Embodiment 2

Figure 6:
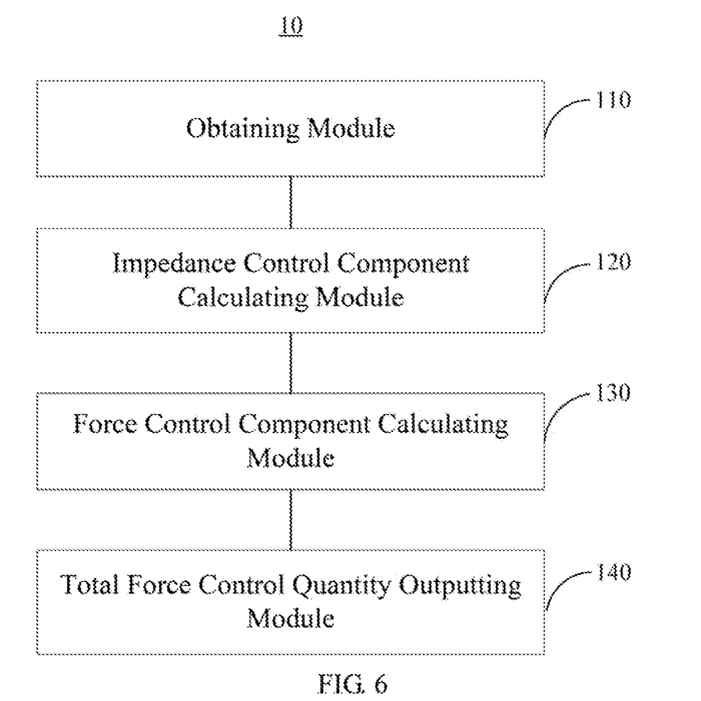
FIG. 6 is a schematic block diagram of a direct force feedback control apparatus according to an embodiment of the present disclosure.

FIG. 6 is a schematic block diagram of a direct force feedback control apparatus according to an embodiment of the present disclosure. As shown in FIG. 6, in this embodiment, a direct force feedback control apparatus 10 is provided based on the direct force feedback control method of the above-mentioned embodiment 1, which can be can be used to control a robotic arm. The apparatus 10 includes:

an obtaining module 110 configured to obtain an actual position and an actual speed of an end of the robotic arm and an actual external force acting on the end of the robotic arm in a Cartesian space;

an impedance control component calculating module 120 configured to calculate an impedance control component of the end of the robotic arm in the Cartesian space based on the obtained actual position, the obtained actual speed, the obtained actual external force, an expected position, an expected speed, and an expected acceleration of the end of the robotic arm;

a force control component calculating module 130 configured to calculate a force control component of the end of the robotic arm in the Cartesian space based on an expected interaction force acting on the end of the robotic arm, the actual external force, and the actual speed; and a total force control quantity outputting module 140 configured to determine whether the actual external force is larger than a preset threshold, and obtain a total force control quantity of the end of the robotic arm in the Cartesian space by adding the force control component and the impedance control component in response to the actual external force being larger than the preset threshold.

In some embodiments, the total force control quantity outputting module 140 is configured to add a preset force control component and the impedance control component to obtain the total force control quantity of the end of the robotic arm in the Cartesian space, in response to the actual external force being smaller than the preset threshold.

For example, for the above-mentioned force control component and preset force control component, a software switch can be used to realize output switching in different conditions. In one embodiment, a control end of the switch is associated with an internally stored preset threshold, the force control component and the preset force control component are respectively used as different inputs of the switch, and the output of the switch and the impedance control component are added.

It can be understood that, the above-mentioned direct force feedback control apparatus 10 corresponds to the direct force feedback control method of embodiment 1. Any optional function in embodiment 1 are also applicable to this embodiment, and will not be described in detail herein.

Embodiment 3

The present disclosure further provides a controller for controlling a robotic arm. The controller includes a processor and a storage. In which, the storage stores a computer program, and the processor is for executing the computer program to implement the direct force feedback control method of embodiment 1 or the function of each module of the direct force feedback control apparatus 10 of embodiment 2, so as to perform precise end force control on the robotic arm.

The present disclosure further provides a robot including the above-mentioned controller, which controls the robotic arm to move smoothly through the controller. In one embodiment, the robot may be any robot such as a cutting robot, a welding robot, a grinding robot, and a massage robot.

The present disclosure further provides a computer-readable storage medium for storing the computer program used in the above-mentioned controller.

In the embodiments provided in the present disclosure, it should be understood that, the disclosed device (apparatus)s and method may also be implemented in other manners. The device embodiments described above are only schematic. For example, the flowcharts and schematic diagrams in the drawings show the possible architectures, functions, and operations according to the devices, methods, and computer program products of the embodiments of the present disclosure. In this regard, each block in the flowchart or block diagram may represent a module, program segment, or part of codes, and the module, program segment, or part of codes contains one or more executable instructions for realizing the specified logic functions. It should also be noted that, in alternative implementations, the functions marked in the blocks may also execute in a different order from the order marked in the drawings. For example, two consecutive blocks can actually be executed basically in parallel, or they can sometimes be executed in the reverse order, depending on the functions involved. It should also be noted that, each block in the schematic diagram and/or flowchart and the combination of the blocks in the schematic diagram and/or flowchart can be realized using a dedicated hardware-based system that executes specified functions or actions, or be realized using a combination of the dedicated hardware and computer instructions.

In addition, the functional modules or units in each embodiment of the present disclosure may be integrated together to form an independent part, or each module or unit may exist alone, or two or more modules or units may be integrated to form an independent part.

In the case that function(s) are implemented in the form of a software functional unit and sold or utilized as a separate product, they can be stored in a non-transitory computer readable storage medium. Based on this understanding, the technical solution of the present disclosure, either essentially or in part, contributes to the prior art, or a part of the technical solution can be embodied in the form of a software product. The software product is stored in a storage medium, which includes a plurality of instructions for enabling a computer device (which can be a smart phone, a personal computer, a server, a network device, or the like) to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The forgoing is only the specific embodiment of the present disclosure, while the scope of the present disclosure is not limited thereto. For those skilled in the art, changes or replacements that can be easily conceived within the technical scope of the present disclosure should be included within the scope of the present disclosure.

What is claimed is:

1. A computer-implemented direct force feedback control method for a robotic arm, comprising:
   providing a controller electrically coupled to the robotic arm;
   obtaining, by the controller, an actual position and an actual speed of an end of the robotic arm and an actual external force acting on the end of the robotic arm in a Cartesian space;
   calculating, by the controller, an impedance control component of the end of the robotic arm in the Cartesian space based on the obtained actual position, the obtained actual speed, the obtained actual external force, an expected position, an expected speed, and an expected acceleration of the end of the robotic arm;
   calculating, by the controller, a force control component of the end of the robotic arm in the Cartesian space based on an expected interaction force acting on the end of the robotic arm, the actual external force, and the actual speed;
   determining, by the controller, whether the actual external force is larger than a preset threshold; and
   obtaining, by the controller, a total force control quantity of the end of the robotic arm in the Cartesian space by adding the force control component and the impedance control component, in response to the actual external force being larger than the preset threshold, and performing an end force control on the robotic arm according to the total force control quantity.

2. The method of claim 1, further comprising:
   obtaining, by the controller, the total force control quantity of the end of the robotic arm in the Cartesian space by adding a preset force control component and the impedance control component, in response to the actual external force being smaller than the preset threshold.

3. The method of claim 2, wherein the end of the robotic arm is provided with a force sensor, the step of obtaining, by the controller, an actual position and an actual speed of an end of the robotic arm and an actual external force acting on the end of the robotic arm in the Cartesian space comprises:
   calculating, by the controller, the actual position and actual speed of the end of the robotic arm in the Cartesian space using a positive kinematics function based on a joint angular displacement and a joint angular velocity of the robotic arm in a joint space; and
   obtaining, by the controller, the actual external force acting on the end of the robotic arm in the Cartesian space measured by the force sensor.

4. The method of claim 1, wherein the step of calculating, by the controller, an impedance control component of the end of the robotic arm in the Cartesian space based on the obtained actual position, the obtained actual speed, the obtained actual external force, the expected position, the expected speed, and the expected acceleration of the end of the robotic arm comprises:
   obtaining, by the controller, corresponding projections in a task subspace by projecting the obtained actual position, actual speed, and actual external force and the expected position, expected speed, and expected acceleration of the end of the robotic arm in the Cartesian space using a force selection matrix;
   calculating, by the controller, a position deviation between the projection of the actual position and the projection of the expected position, and a speed deviation between the projection of the actual speed and the projection of the expected speed;
   calculating, by the controller, the impedance control quantity using a mass-spring-damper model based on the position deviation, the speed deviation and the projection of the actual external force, and calculating an acceleration control quantity in the task subspace based on the impedance control quantity and the projection of the expected acceleration; and
   mapping, by the controller, the acceleration control quantity from the task subspace to the Cartesian space to calculate the corresponding impedance control component using a Jacobian matrix.

5. The method of claim 1, wherein the step of calculating, by the controller, the force control component of the end of the robotic arm in the Cartesian space based on the expected interaction force acting on the end of the robotic arm, the actual external force, and the actual speed comprises:
   obtaining, by the controller, corresponding projections in a task subspace by projecting the actual external force, the actual speed, and the expected interaction force of the end of the robotic arm in the Cartesian space using a force selection matrix;
   calculating, by the controller, a force deviation between the projection of the actual external force and the projection of the expected interaction force, and obtaining a force control quantity in the task subspace by adding speed damping quantities obtained through the projection of the actual speed based on the force deviation after a proportional-integral calculation; and
   mapping, by the controller, the force control quantity from the task subspace to the Cartesian space and calculating the corresponding force control component using a Jacobian matrix.

6. The method of claim 2, wherein the preset force control component is zero.

7. A controller for a robotic arm, comprising:
   a processor;
   a memory coupled to the processor; and
   one or more computer programs stored in the memory and executable on the processor;
   wherein, the one or more computer programs comprise:
   instructions for obtaining an actual position and an actual speed of an end of the robotic arm and an actual external force acting on the end of the robotic arm in a Cartesian space;
   instructions for calculating an impedance control component of the end of the robotic arm in the Cartesian space based on the obtained actual position, the obtained actual speed, the obtained actual external force, an expected position, an expected speed, and an expected acceleration of the end of the robotic arm;

instructions for calculating a force control component of the end of the robotic arm in the Cartesian space based on an expected interaction force acting on the end of the robotic arm, the actual external force, and the actual speed;

instructions for determining whether the actual external force is larger than a preset threshold; and instructions for obtaining a total force control quantity of the end of the robotic arm in the Cartesian space by adding the force control component and the impedance control component, in response to the actual external force being larger than the preset threshold, and performing an end force control on the robotic arm according to the total force control quantity.

8. The controller of claim 7, wherein the one or more computer programs further comprise:

instructions for obtaining the total force control quantity of the end of the robotic arm in the Cartesian space by adding a preset force control component and the impedance control component, in response to the actual external force being smaller than the preset threshold.

9. The controller of claim 8, wherein the end of the robotic arm is provided with a force sensor, the instructions for obtaining an actual position and an actual speed of an end of the robotic arm and an actual external force acting on the end of the robotic arm in the Cartesian space comprise:

instructions for calculating the actual position and actual speed of the end of the robotic arm in the Cartesian space using a positive kinematics function based on a joint angular displacement and a joint angular velocity of the robotic arm in a joint space; and instructions for obtaining the actual external force acting on the end of the robotic arm in the Cartesian space measured by the force sensor.

10. The controller of claim 7, wherein the instructions for calculating an impedance control component of the end of the robotic arm in the Cartesian space based on the obtained actual position, the obtained actual speed, the obtained actual external force, the expected position, the expected speed, and the expected acceleration of the end of the robotic arm comprise:

instructions for obtaining corresponding projections in a task subspace by projecting the obtained actual position, actual speed, and actual external force and the expected position, expected speed, and expected acceleration of the end of the robotic arm in the Cartesian space using a force selection matrix;

instructions for calculating a position deviation between the projection of the actual position and the projection of the expected position, and a speed deviation between the projection of the actual speed and the projection of the expected speed;

instructions for calculating the impedance control quantity using a mass-spring-damper model based on the position deviation, the speed deviation and the projection of the actual external force, and calculating an acceleration control quantity in the task subspace based on the impedance control quantity and the projection of the expected acceleration; and instructions for mapping the acceleration control quantity from the task subspace to the Cartesian space to calculate the corresponding impedance control component using a Jacobian matrix.

11. The controller of claim 7, wherein the instructions for calculating the force control component of the end of the robotic arm in the Cartesian space based on the expected interaction force acting on the end of the robotic arm, the actual external force, and the actual speed comprise:

instructions for obtaining corresponding projections in a task subspace by projecting the actual external force, the actual speed, and the expected interaction force of the end of the robotic arm in the Cartesian space using a force selection matrix;

instructions for calculating a force deviation between the projection of the actual external force and the projection of the expected interaction force, and obtaining a force control quantity in the task subspace by adding speed damping quantities obtained through the projection of the actual speed based on the force deviation after a proportional-integral calculation; and instructions for mapping the force control quantity from the task subspace to the Cartesian space and calculating the corresponding force control component using a Jacobian matrix.

12. The controller of claim 8, wherein the preset force control component is zero.

13. A robot comprising a controller, wherein the controller comprises:

a processor;

a memory coupled to the processor; and one or more computer programs stored in the memory and executable on the processor;

wherein, the one or more computer programs comprise:

instructions for obtaining an actual position and an actual speed of an end of the robotic arm and an actual external force acting on the end of the robotic arm in a Cartesian space;

instructions for calculating an impedance control component of the end of the robotic arm in the Cartesian space based on the obtained actual position, the obtained actual speed, the obtained actual external force, an expected position, an expected speed, and an expected acceleration of the end of the robotic arm;

instructions for calculating a force control component of the end of the robotic arm in the Cartesian space based on an expected interaction force acting on the end of the robotic arm, the actual external force, and the actual speed;

instructions for determining whether the actual external force is larger than a preset threshold; and instructions for obtaining a total force control quantity of the end of the robotic arm in the Cartesian space by adding the force control component and the impedance control component, in response to the actual external force being larger than the preset threshold, and performing an end force control on the robotic arm according to the total force control quantity.

14. The robot of claim 13, wherein the one or more computer programs further comprise:

instructions for obtaining the total force control quantity of the end of the robotic arm in the Cartesian space by adding a preset force control component and the impedance control component, in response to the actual external force being smaller than the preset threshold.

15. The robot of claim 14, wherein the end of the robotic arm is provided with a force sensor, the instructions for obtaining an actual position and an actual speed of an end of the robotic arm and an actual external force acting on the end of the robotic arm in the Cartesian space comprise:

instructions for calculating the actual position and actual speed of the end of the robotic arm in the Cartesian space using a positive kinematics function based on a joint angular displacement and a joint angular velocity of the robotic arm in a joint space; and instructions for obtaining the actual external force acting on the end of the robotic arm in the Cartesian space measured by the force sensor.

16. The robot of claim 13, wherein the instructions for calculating an impedance control component of the end of the robotic arm in the Cartesian space based on the obtained actual position, the obtained actual speed, the obtained actual external force, the expected position, the expected speed, and the expected acceleration of the end of the robotic arm comprise:

instructions for obtaining corresponding projections in a task subspace by projecting the obtained actual position, actual speed, and actual external force and the expected position, expected speed, and expected acceleration of the end of the robotic arm in the Cartesian space using a force selection matrix;

instructions for calculating a position deviation between the projection of the actual position and the projection of the expected position, and a speed deviation between the projection of the actual speed and the projection of the expected speed;

instructions for calculating the impedance control quantity using a mass-spring-damper model based on the position deviation, the speed deviation and the projection of the actual external force, and calculating an acceleration control quantity in the task subspace based on the impedance control quantity and the projection of the expected acceleration; and instructions for mapping the acceleration control quantity from the task subspace to the Cartesian space to calculate the corresponding impedance control component using a Jacobian matrix.

17. The robot of claim 13, wherein the instructions for calculating the force control component of the end of the robotic arm in the Cartesian space based on the expected interaction force acting on the end of the robotic arm, the actual external force, and the actual speed comprise:

instructions for obtaining corresponding projections in a task subspace by projecting the actual external force, the actual speed, and the expected interaction force of the end of the robotic arm in the Cartesian space using a force selection matrix;

instructions for calculating a force deviation between the projection of the actual external force and the projection of the expected interaction force, and obtaining a force control quantity in the task subspace by adding speed damping quantities obtained through the projection of the actual speed based on the force deviation after a proportional-integral calculation; and instructions for mapping the force control quantity from the task subspace to the Cartesian space and calculating the corresponding force control component using a Jacobian matrix.

18. The robot of claim 14, wherein the preset force control component is zero.

* * * * *